United States Patent
Efremov et al.

(10) Patent No.: US 12,321,405 B2
(45) Date of Patent: Jun. 3, 2025

(54) SYSTEM AND METHOD FOR PROVIDING A TRAINED MODEL TO A COMPUTING DEVICE OF A USER

(71) Applicant: AO Kaspersky Lab, Moscow (RU)

(72) Inventors: Andrey A. Efremov, Moscow (RU); Pavel V. Filonov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 18/660,352

(22) Filed: May 10, 2024

(65) Prior Publication Data

US 2024/0296193 A1  Sep. 5, 2024

Related U.S. Application Data

(63) Continuation of application No. 18/194,835, filed on Apr. 3, 2023, now Pat. No. 12,026,211, which is a continuation of application No. 16/882,499, filed on May 24, 2020, now Pat. No. 11,645,346.

(30) Foreign Application Priority Data

Nov. 27, 2019 (RU) .............................. 2019138372

(51) Int. Cl.
*H04N 21/45* (2011.01)
*G06F 16/9535* (2019.01)
*G06N 20/00* (2019.01)
*H04L 9/40* (2022.01)

(52) U.S. Cl.
CPC ......... *G06F 16/9535* (2019.01); *G06N 20/00* (2019.01); *H04L 63/102* (2013.01)

(58) Field of Classification Search
None
See application file for complete search history.

(56) References Cited

U.S. PATENT DOCUMENTS

| | | | |
|---|---|---|---|
| 2012/0054040 A1* | 3/2012 | Bagherjeiran | G06Q 30/00 705/14.66 |
| 2015/0039315 A1 | 2/2015 | Gross | |
| 2018/0246983 A1* | 8/2018 | Rathod | G06F 16/972 |
| 2020/0097678 A1 | 3/2020 | Beloussov et al. | |

* cited by examiner

*Primary Examiner* — Cai Y Chen
(74) *Attorney, Agent, or Firm* — ArentFox Schiff LLP; Michael Fainberg

(57) ABSTRACT

Disclosed herein are systems and methods for providing a trained model to a computing device of a user. In one aspect, an exemplary method comprises, receiving, by a model transmitter, registration information from the computing device of the user comprising a trained model of the user's behavior, wherein the model is constructed using software provided by a service, storing, by the model transmitter, the received registration information in a database of behavior models, and during a repeat visit, by the user, to the service, updating the trained model of the user's behavior and transmitting the updated trained model to the service, wherein the updated trained model differs from a previously sent model of the user's behavior by no more than is allowed for unambiguous identification of the user on the service.

21 Claims, 3 Drawing Sheets

SYSTEM AND METHOD FOR PROVIDING A TRAINED MODEL TO A COMPUTING DEVICE OF A USER

CROSS REFERENCE TO RELATED APPLICATIONS

The present application is a continuation of U.S. patent application Ser. No. 18/194,835 which is a continuation of U.S. patent application Ser. No. 16/882,499 which claims priority to Russian Patent Application No. 2019138372, filed on Nov. 27, 2019, the entire contents of which are incorporated herein by reference.

FIELD OF TECHNOLOGY

The present disclosure relates to the field of data analysis and machine learning, more specifically, to systems and method of generating individual content for users of services.

BACKGROUND

The rapid development of computer technologies in the past decade, as well as the widespread use of various computing devices (personal computers, notebooks, tablets, smartphones, and so forth) have become powerful stimuli for increase in usage of these devices for various activities and for an enormous number of tasks. Some examples of the tasks include Internet surfing, banking activity (e.g., remittances), transmitting electronic documents, and the like. However, in parallel with the rapid growth in the number of computing devices and the volume of software running on these devices, there is a rapid growth in malicious activities. For example, the number of malicious programs, methods of unauthorized access to data being processed by said devices, fraudulent methods of using this data, continue to grow. Thus, problems of information security are becoming particularly important.

Much attention is starting to be paid, not only for ensuring the information security of personal data of users, but also for the protection of personal data of users. The protection of personal data may be against hypothetical (oftentimes even unlikely) threats, such as successful targeted attacks on servers storing the personal data of users, and so forth. In the European Union, solutions based on the concept of voluntary consent (for example, the general data protection regulation (GDPR)) have been introduced for this purpose. In addition, solutions for ensuring maximum volume storage of personal data of users on computing devices of users and minimum possible analysis and use of such data at external services have also been introduced.

At present, the use of trained models (and machine learning, in general) has become widespread in various fields of human activity. Efforts have also been made to use trained models for keeping personal data of users and to use the personal data of users for various tasks. For example, models trained based on personal data of users may allow: user preferences to be predicted in certain areas of commerce or other information technologies, users to be identified, and so forth. One of the principal advantages of the trained models is the impossibility of extracting, from the trained model, the personal data used to train the model. Thus, the trained model enables usage of the personal user data without disclosing the personal user data (or transferring the data from one computing device to another, which would have a negative impact on the information security of the user data). The approaches described above use technologies to deal with the tasks of identification of users by their behavior (actions). However, the user actions themselves are in no way concealed; this data, which is personal user data, is sent for analysis (identification) to other computing devices (including remote computing devices). Hence, the user actions may be vulnerable to unauthorized access.

Thus, there is a need for a more optimal way of providing services to users based on personal user data without sending the data through a network.

SUMMARY

Aspects of the disclosure relate to providing a trained model to a computing device of a user. Another aspect of the disclosure relates to providing information security while training a model to identify a user to a predetermined degree of reliability and generating individual content for the user of a service, by transmitting, to the service, a model of the user's behavior which has been trained with personal user data, without transmitting the actual personal user data. Yet another aspect of the disclosure relates to providing an assurance for security of the personal user data by identifying the user based on the model of the user's behavior which has been trained with the personal user data-rather than identifying the user based on the actual personal user data.

In one exemplary aspect, a method is described for providing a trained model to a computing device of a user, the method comprising: receiving, by a model transmitter, registration information from the computing device of the user comprising a trained model of the user's behavior, wherein the model is constructed using software provided by a service, storing, by the model transmitter, the received registration information in a database of behavior models, and during a repeat visit, by the user, to the service, updating the trained model of the user's behavior and transmitting the updated trained model to the service, wherein the updated trained model differs from a previously sent model of the user's behavior by no more than is allowed for unambiguous identification of the user on the service.

In one aspect, the model transmitter comprises: a separate application that intercepts requests for services, where the interception is performed to provide, to the services to which the requests are directed, a trained model of user behavior as a user identifier.

In one aspect, the model transmitter comprises: a plugin that is installed in a browser of the computing device of the user that automatically provides the trained model of user behavior to the service when the user visits a site of the respective service.

In one aspect, the model transmitter comprises: a script that contains elements of the trained model of user behavior and that is embedded on the site of the service.

In one aspect, the model transmitter authorizes a user on the service based on a result of a comparison of the model of user behavior and models of user behaviors stored in the database of behavior models, such that a first user working on a same computing device as a second user is distinguishable from the second user to a predetermined degree of reliability.

In one aspect, the method further comprises: transmitting the trained model to a content generator.

In one aspect, the trained model is transmitted to the content generator at least based on one of: a predetermined frequency; and a demand by the content generator.

According to one aspect of the disclosure, a system is described for providing a trained model to a computing device of a user, the system comprising at least one memory and at least one hardware processor of a computing device coupled to the at least one memory, and configured to: receive, by a model transmitter, registration information from the computing device of the user comprising a trained model of the user's behavior, wherein the model is constructed using software provided by a service, store, by the model transmitter, the received registration information in a database of behavior models, and during a repeat visit, by the user, to the service, update the trained model of the user's behavior and transmit the updated trained model to the service, wherein the updated trained model differs from a previously sent model of the user's behavior by no more than is allowed for unambiguous identification of the user on the service.

In one exemplary aspect, a non-transitory computer-readable medium is provided storing a set of instructions thereon for providing a trained model to a computing device of a user, wherein the set of instructions comprises instructions for: receiving, by a model transmitter, registration information from the computing device of the user comprising a trained model of the user's behavior, wherein the model is constructed using software provided by a service, storing, by the model transmitter, the received registration information in a database of behavior models, and during a repeat visit, by the user, to the service, updating the trained model of the user's behavior and transmitting the updated trained model to the service, wherein the updated trained model differs from a previously sent model of the user's behavior by no more than is allowed for unambiguous identification of the user on the service.

The method and system of the present disclosure are designed to provide a trained model to a computing device of a user The user is identified based on the model of the user's behavior which has been trained with the personal user data-rather than based on the actual personal user data.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and a computer program for providing a trained model to a computing device of a user Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

In one aspect, the present disclosure describes a system for providing a trained model to a computing device of a user that is implemented on a computing system, that includes real-world devices, systems, components, and groups of components realized with the use of hardware such as integrated microcircuits (application-specific integrated circuits, ASICs) or field-programmable gate arrays (FPGAs) or, for example, in the form of a combination of software and hardware such as a microprocessor system and set of program instructions, and also on neurosynaptic chips. The functionality of such means of the system may be realized solely by hardware, and also in the form of a combination, where some of the functionality of the system means is realized by software, and some by hardware. In certain aspects, some or all of the components, systems, etc., may be executed on the processor of a general-purpose computer (such as the one shown in FIG. 3). Furthermore, the system components may be realized either within a single computing device or spread out among several interconnected computing devices.

Figure 1:
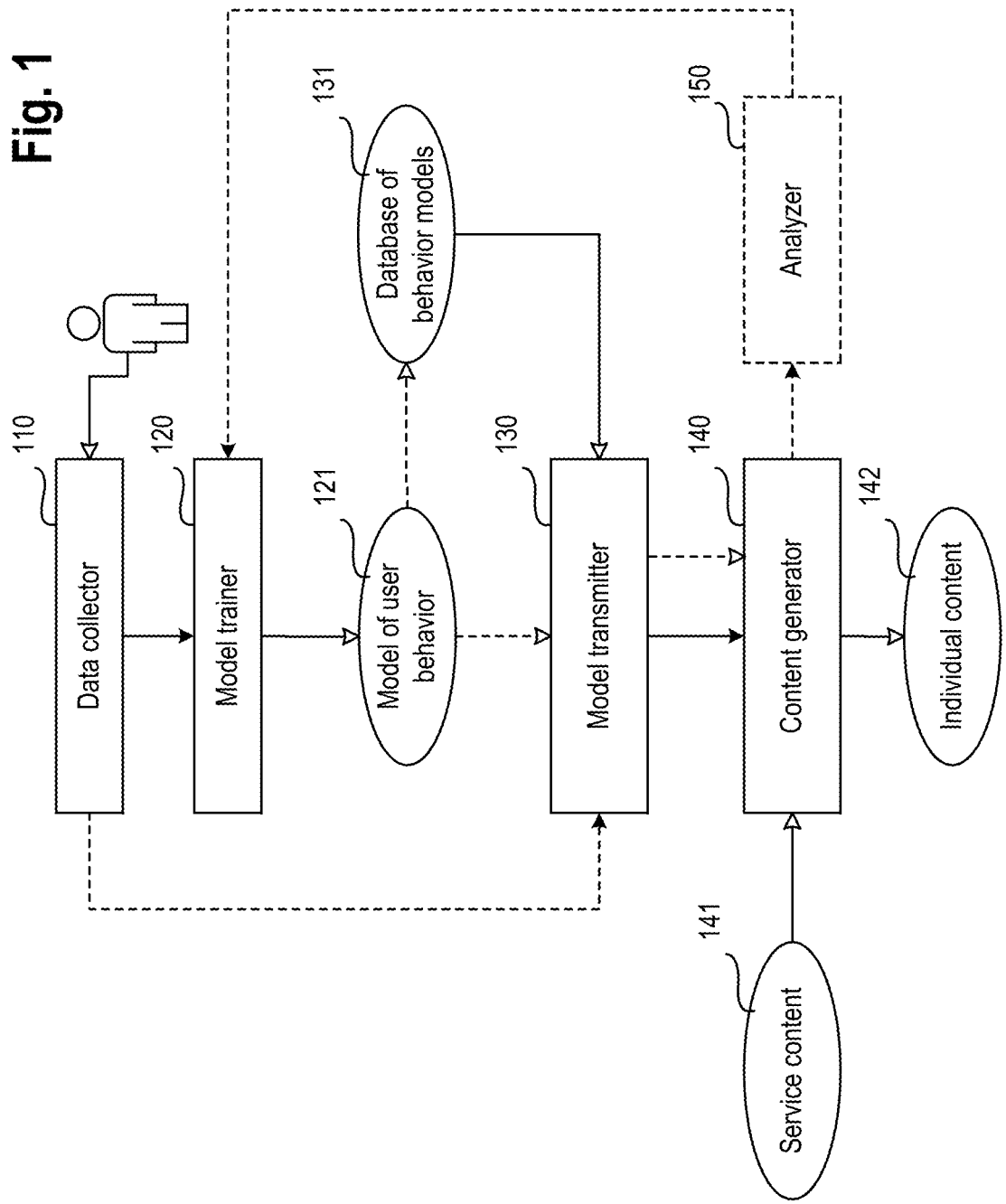
FIG. 1 illustrates a system for generating individual content for a user of a service in accordance with aspects of the present disclosure.

FIG. 1 illustrates a system 100 for generating individual content for a user of a service in accordance with aspects of the present disclosure. In one aspect, the system 100 comprises a data collector 110, a model trainer 120, a model of user behavior 121, a model transmitter 130, a database of behavior models 131, a content generator 140, service content 141, individual content 142, and an analyzer 150.

In one aspect, a prime purpose of the system 100 is to generate, from among a predetermined service content of a remote service, the individual user content. The individual user content is generated based on an analysis of the user's behavior while working on his/her computing device.

In one aspect, the remote service comprises at least one of:
  an online store;
  an advertising platform presenting advertising to users (for example, containing information sites); and
  a resource providing information services.

In one aspect, when the remote service comprises an online store, the service content includes at least a collection of goods available in the online store. In one aspect, the service content further includes information about the goods in the collection.

In one aspect, when the remote service comprises the advertising platform, the service content comprises advertising blocks that include media data advertising goods and services, such as banner ads.

In one aspect, when the remote service comprises the resource for providing information services, the service content comprises: information, news, and any number of other data blocks being sent to users. The information, news, etc. being sent to users may be similar to content sent via RSS channels.

In one aspect, the data collector 110 gathers data (i.e., logs data) on behavior of the user during usage of the computing device of the user, and sends the gathered data to the model trainer 120.

In one aspect, the computing device of the user comprises at least:
  a personal computer;
  a notebook;
  a tablet; and
  a mobile telephone or cellphone.

In one aspect, the computing device comprises a collection of computing devices on which software is running, wherein the collection of computing devices are interconnected by a single user account. For example, the computing device may be a personal computer of the user, an iPhone of the user, and an iPad tablet, on which software is running that is connected to remote services under a single account (such as YouTube under a single account) or to a single cloud service (such as one based on Handoff technology), i.e., a computing device on which a Single Sign-On (SSO) technology is used.

In one aspect, the gathered data on the behavior of the user includes at least one of:
  names of applications with which the user is working, the time the user has been working in the respective applications, actions performed by the user in the respective applications;
  search queries issued by the user;
  addresses of sites (online) visited by the user, actions performed by the user on the respective sites (e.g., which links were used by the user to jump, extract and copy text from the pages of the sites, and so forth);
  data from forms filled out by the user;
  information on cursor movements of a mouse, touchpad, and other data entry devices;
  jumps to other pages from a landing page;
  identifiers of data entry means or devices (hardware ID); and
  identifiers of a client application.

For example, the system may gather requests made to voice assistants, such as Alisa, Alexa, Siri and so forth, as the data on the behavior of the user.

In yet another example, as the data on the behavior of the user, the system gathers Google search queries and addresses of sites the user visited after each search query.

In one aspect, the data collected by the data collector 110 is analyzed such that at least one of the following is performed:
  no data is logged having a low priority when generating the individual content for the user of the service by the content generator 140;
  no duplicate data is logged; and
  incorrect (wrong) data is corrected.

In one aspect, the model trainer 120 trains the model of user behavior 121 based on the data gathered and sends the trained model of user behavior 121 to the model transmitter 130.

In one aspect, the model of user behavior 121 comprises a model based on a neural net with weights, which is used to predict a next behavior of the user.

For example, the trained model of user behavior 121 may be generated based on data on search queries of the user so that, when that model 121 is used, it is possible to determine which of the known search queries (including modified known search queries, i.e., queries composed on the basis of combining several known queries) will be performed by the user in the future. The known search query with the greatest probability is selected.

In one aspect, the model of user behavior 121 is trained so that the model 121 identifies the user with a given degree of reliability.

In another aspect, the training of the model of user behavior 121 comprises:
  parameterizing the gathered data on the behavior of the user in a form of a vector (for example, via a lexical analysis, speech is translated into words, and words into a vector of words);
  obtaining a cleared vector by removing low-priority information from the obtained vector, removing noise, and so on; and
  sending the cleared vector to the input of the training algorithm.

For an illustrative example, for two users who worked on the same computing device, yet performed different actions (working with different applications, making different search queries, filling out different forms, and so on), different trained models of user behavior 121 will be generated, these two trained models unambiguously differ from each other, while the degree of their difference will characterize the level of reliability of the user identification for the given trained model of user behavior 121. Different metrics (see below) may be used for comparing these trained models of behavior of the user 121. Furthermore, for the same user working at different times on the computing device, similar trained models of user behavior 121 are generated, so that only one user will be identified with the given degree of reliability.

In one aspect, the model of user behavior 121 is first trained so as to characterize the behavior of a large group of users. For different groups of users, several different models of user behavior 121 may be trained in order to characterize different groups of users.

One of these models of user behavior 121 is sent to the model trainer 120, depending on the data gathered by the data collector 110. Such an approach makes it possible to reduce the demands on the resources of the computing device of the user, since complete training of the model of the user behavior is not done, but only further training.

In one aspect, pre-trained models of user behavior 121 are generated on a remote service, wherein individual content 142 is generated, for each particular user, depending on the trained model of user behavior 121 of the respective particular user.

For an illustrative example, suppose the service is for providing advertising materials in the form of banner ads on news sites and online magazines. The service generates different trained models of user behavior 121, characterizing different groups of users (sportspeople, housewives, students, and so forth). Depending on which of the partner sites of that service is visited by a particular user, the system for generating the individual content for the user of the service will be sent the corresponding pre-trained model of the user behavior. For example, for users visiting an online store of sporting goods, a trained model of user behavior 121 will be sent that has been previously trained on the behavior of sportspeople. Such a pre-trained model of user behavior 121 is attuned (trained) to consider the search queries of a user on sites with a sporting theme and the use of sporting applications (trackers, heart rate monitors, and so forth), and to ignore other data gathered by the data collector 110 (i.e., the other data makes little or no contribution to the result of the working of the trained model of user behavior).

In one aspect, the model transmitter 130 sends the trained model 121 to the content generator 140.

In one aspect, the model transmitter 130 determines whether conditions for sending the trained model 121 are fulfilled prior to the transmission of the trained model 121 to the content generator 140. For example, user authorization, etc. may be needed.

In one aspect, the database of behavior models 131 contains the models of user behavior gathered during a registration of a user on a service.

For an illustrative example, an online book selling service may contain a database of registered users, where the registration information that is sent is not the user's login and password, but rather a trained model 121 of his or her behavior, where the model 121 itself is constructed using software provided by the service, including at least the data collector 110, the model trainer 120, and a model transmitter 130. Thus, after the user's first visit to the service, and after the trained model 121 has been generated and sent to the service, the trained model resides in the database of behavior models 131. During the user's repeat visits to the service, a further trained model of the user behavior 121 will be sent (specifically, by the model transmitter 130), which may differ from the previously sent model of the user behavior 121, but not by more than is allowed for unambiguous identification of the user on that service.

In one aspect, the model transmitter 130 comprises at least:
- a separate application that intercepts requests for services, where the interception is performed to provide, to the services to which the requests are directed, a trained model of user behavior 121 as a user identifier;
- a plugin that is installed in a browser of the computing device of the user that automatically provides a trained model of user behavior 121 to a service when the user visits a site of the respective service; and
- a script (for example, in the form of JS code) that contains elements of the trained model of user behavior 121 and that is embedded on the site of the service.

For an illustrative example, the model transmitter 130 may be a plugin for the Google Chrome browser, which is installed on the computing system of a user by request of the site of an online bookselling store during the first visit to that site. This plugin will send the generated model of user behavior 121 as the user identifier each time that site is visited.

In one aspect, the model transmitter 130 sends the trained model of user behavior 121 to the content generator 140 at least:
- with a predetermined frequency; and
- on demand by the content generator 140.

For example, if the user is using certain software provided by the service, that software (described above) may send, to the service, updated (i.e., further trained) models of user behavior 121 with a frequency of once a day. As a result, the user upon visiting the service is at least:
- always authorized on the service; and/or
- receives relevant and fresh information, i.e., individual content 142 of the service.

In one aspect, the model transmitter 130 authorizes a user on the service based on a result of a comparison of the model of user behavior 121 sent to the content generator 140 and the models obtained from a database of behavior models 131. For example, if two users are working on the same computing device, the trained model of the behavior of user No. 1 should differ from the trained model of user No. 2 so much that it is possible to distinguish those users with a given degree of reliability. If the same user has worked on different computing devices at different times, the trained model of the user generated on the basis of data from computing device No. 1 should be similar to the trained model of the user generated on the basis of data from computing device No. 2.

In one aspect, the comparison of the two behavior models is done by using at least:
- matrices of scatter plots;
- individual scatter plots; and
- statistical significance tests.

For an illustrative example, the parameters of a neural net act as a scatter plot.

In one aspect, two trained behavior models may be compared against each other based on an analysis of results of the two trained behavior models when used on a previously prepared test sample of data.

In one aspect, the test sample may be prepared from a calculation of which actions the users can (or should) perform on the given service. For example, the test sample may include search queries for goods of an online store which the users have visited, or search queries for goods and services, by advertising displayed to the users, and so forth.

For example, suppose, for user No. 1, the behavior model is trained using search queries of user No. 1 and a certain group of other users, while, for user No. 2, the behavior model is trained using search queries of user No. 2 and a certain group of other users (not necessarily the same as the training of the behavior model of user No. 1). In order to verify how similar the trained behavior models of users No. 1 and No. 2 are to each other, a previously prepared test sample of search queries is put into the models. At the output of the model, the probabilities of a particular query pertaining to the corresponding user are calculated (i.e., user No. 1 for the trained behavior model of user No. 1, user No. 2 for the trained behavior model of user No. 2). The comparison of the obtained results is used to determine whether these behavior models of the users are similar or different.

The content generator 140 generates the individual content 142 for the user of the service based on a predetermined service environment 141, taking into account the behavior model 121 provided by the model transmitter 130.

In one aspect, the specified service environment 141 comprises at least:
- a list of goods and services to which access may be granted to the user, where access to a good comprises providing the user with information about the good or service and the ability to order the good or service, including the purchasing of (paying for) the ordered good or service; and
- data which the user has been granted permission to access based on an analysis of the user behavior model 121 provided by the model transmitter 130.

For an illustrative example, suppose the user visits an online household appliance selling service, after which the model transmitter 130 sends to the service a model of the user behavior 121 which has been trained with the search queries of the user. The trained model of the user behavior 121 that is provided to the service will be used to identify the user and to authorize him/her on the given service. Based on the trained model of the user 121 provided and based on previous search queries for goods provided by the online merchant service, a determination is made as to which list of goods have a higher priority for that user (primarily goods for which search queries are being made, related goods, and so forth). Then, catalogs and price lists are generated for that user based on the determined list of goods.

Thus, the user is presented with certain previously prepared information based on his/her personal data (for example, search queries), without presenting the search queries themselves to the service, but only a model of the user behavior 121, wherein the model is trained by those search queries—thereby heightening the information security of the personal data of the user.

In yet another example, suppose the service is for an advertising agency that provides contextual advertising to users through various platforms (variously themed sites: news sites, forums, online stores, and so forth). For a more precise operation of the service, i.e., for the selecting of more relevant advertising for each particular user, an analysis of user data is required: where the analysis includes data as to the behavior of the user on the computing device and in the network, which applications the user is using, which queries he or she is making, which sites are being visited, and so forth. The service needs these types of data to be gathered. On one hand the gathering of much data without the consent of the user is unlawful; on the other hand, even the gathering of data with the consent of the user may result in an unauthorized access to the data so gathered—thereby presenting a risk for the user in terms of a reputation risk and a financial risk. Therefore, the method of the present disclosure provides an advantage for the user. The method of the present disclosure uses a model of the user behavior 121 which has been trained with the computing devices of the user. However, the model does not contain the user data (including personal data). In addition, the model can be used for identification of the user, predicting his or her behavior, interests, and so forth.

In some scenarios, the use of trained models of user behavior 121 may result in high demands on computing resources of the computing device of the user. Even if the training of the model of user behavior on the computing device of the user is done in real time mode, this may affect the performance of the computing device itself, and the operations of applications being used by the user, in a way noticeable to the user. For example, the computing device of the user may work more slowly, the consumption of RAM may be higher, and the time of autonomous operation for mobile devices may be shorter when the training of the model of user behavior 121 is being done on the computing device of the user. In order to prevent the demand on the computing resources of the computing device of the user from being too high, in one aspect, the method of the present disclosure uses previously trained models of the user behavior 121, and updates the model by further training the previously trained model for use.

The approach described above is able to solve the problems described above and provides the following significant advantages:

the user is provided with a model of user behavior 121 designed to generate individual content 142 for the user of a particular service, which significantly improves the accuracy of the generating of that individual content 142;

the training (further training) of the model of user behavior 121 does not result in a sending of the user data beyond the computing device (for example, in a computer network to a specialized service), which heightens the information security of the user's data; and the further training of the model of user behavior 121, and not a complete training of the model of user behavior 121, reduces the demands on the computing resources of the computing device of the user.

For an illustrative example, for the advertising agency described above, different pre-trained models of user behavior 121 are used for different platforms (sites). For instance, for news sites the models are pre-trained to take account of search queries of users for news of interest to them, to determine which topics are of greatest interest to the users, and so forth; on sporting sites, they are trained to take account of the sporting applications being used on the computing devices of the users, and so on. Such models of user behavior 121 are issued to the users as identifiers for visiting the corresponding sites (for example, to receive individual news, for access to forums, personal accounts, and so forth) and are then provided, from the users, to the corresponding sites (upon going to the sites, for example, using special plugins installed in the browsers), and from the sites to the advertising agency (the service). On the basis of the already fully trained models of user behavior 121, the advertising agency determines which specific advertising it needs to show to a particular user.

In addition, different advertising agencies (different services) may exchange the trained and pre-trained models of user behavior 121 with each other to increase the accuracy of generating individual content for the user of a particular site.

In one aspect, the analyzer 150 gather data on actions of a user on a service, analyzes statistics as to the actions of the user on the service based on the gathered data, and makes a decision as to a need for retraining of the model of the user behavior 121. In one aspect, the result of the analysis by the analyzer 150 is used: to determine which specific actions are performed by the user (for example, which goods are of interest to him or her, which purchases he or she is making, and so forth), to make a decision as to the need for retraining or further training of the model of user behavior 121 so that more relevant content of the service 142 is generated for that user during later visits to the service. In one aspect, time spent on the service, a number of purchases made or declined, a number of messages sent to customer support, and so forth, may be used to assess a relevance of the result of the analysis.

In one aspect, the model of user behavior 121 may be generated (trained) not completely, but instead a partly trained ready-made model of the behavior of a "universal" user may be further trained. For example, when the trained model of user behavior 121 is a neural net, the further training involves correcting the weights of the layers of that neural net based on data obtained from the content generator 140.

For example, when the service is an online store, during the first visit of the user to the site of the online store, an already pre-trained model of user behavior 121 is provided to the user as an identifier depending on the actions which the user performs on the site (for example, which catalogs he or she views, which goods he or she is looking for, and so forth) for access to his or her personal account in that online store. This model takes into account certain search queries already made by the user and is attuned to a more accurate prediction of what is needed by the given user in that online store. The preliminary training of the model of user behavior 121 takes into account the behavior of a large group of people with similar queries, so that on one hand that model of user behavior 121 is appropriate to a large number of users, but on the other hand, the use of this model of user behavior 121 when generating individual content for the user of that online store may lead to less correct results. Therefore, it is necessary to further train the provided model of user behavior 121 on the computing device of the user. In part, this reduces the demands on the computing resources of the computing device of the user, and speeds up the training of the model of user behavior because the entire cycle of training with large training samples and so forth does not need to be performed. Moreover, if the same originally trained model of user behavior 121 is provided to two different users, these two models will differ after being further trained on their computing devices, depending on the actions of the users.

Figure 2:
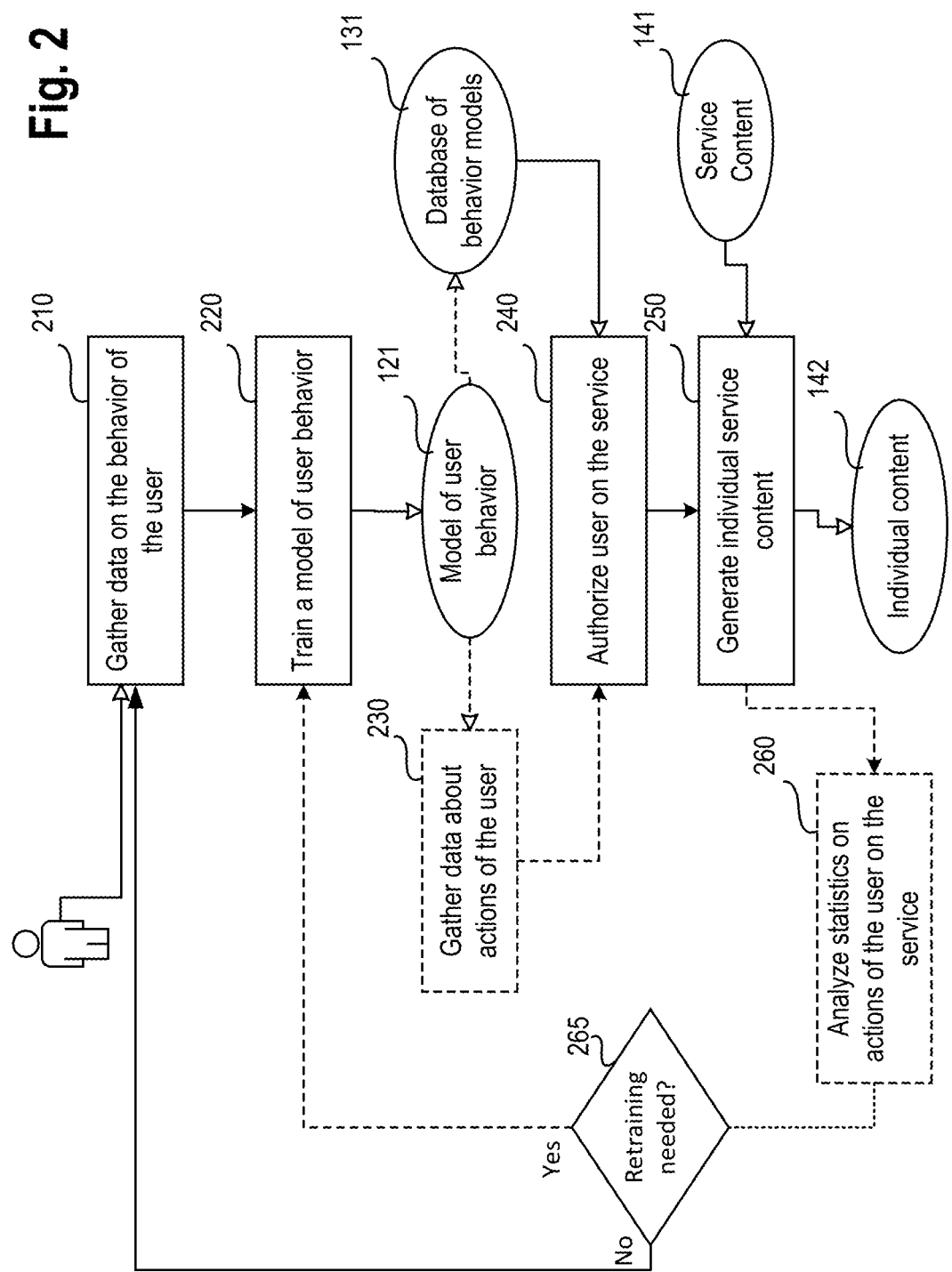
FIG. 2 illustrates an exemplary method for generating individual content for a user of a service in accordance with aspects of the present disclosure.

FIG. 2 illustrates an exemplary method 200 for generating individual content for a user of a service in accordance with aspects of the present disclosure.

The structural diagram of the method for generating individual content for the user of a service contains a step 210, in which data is gathered on the behavior of a user, a step 220, in which a model of user behavior is trained, a step 230, in which data is gathered on the actions of the user, a step 240, in which the user is authorized on the service, a step 250, in which individual content of the user is generated, and a step 260, in which statistics are analyzed as to the actions of the user on the service.

In step 210, by a data collector 110, method 200 gathers data on behavior of a user of a computing device.

In step 220, by a model trainer 120, method 200 trains a model of a user behavior 121 based on the gathered data such that the trained model identifies the user to a predetermined degree of reliability.

In step 230, by an analyzer 150, method 200 gathers data on actions of the user while accessing a service.

In step 240, by a model transmitter 130, method 200 authorizes the user for the service based on a result of a comparison of the trained model of the user behavior 121 with any number of models obtained from a database of behavior models 131. The trained model of the user behavior 121 is received from the model trainer 120. The model transmitter 130 provides a model to the content generator 140. Thus, in one aspect, the method further comprises: prior to the generating of the individual content for the user of a service, authorizing the user for the service based on a result of a comparison of the model of the user behavior provided by the model transmitter with one or more models obtained from a database of behavior models.

In step 250, by content generator 140, method 200 generates an individual content 142 for the user of the service based on a predetermined service environment 141 in accordance with a behavior model 121 received from a model transmitter 130.

In step 260, by the analyzer 150, method 200 analyzes statistics on the actions of the user on the service based on the data gathered on the actions of the user.

In step 265, by the analyzer 150, method 200 determines whether or not there is a need to retrain the model of user behavior 121. If there is a need to retrain the model, the method proceeds to step 220. Otherwise, the method proceeds to step 210.

In one aspect, the data on the behavior of the user describes at least one of: one or more applications with which the user is working, a time during which the user is working on a respective application of the one or more applications, an action performed by the user in the respective application of the one or more applications, a search query issued by the user, one or more sites visited by the user, an action performed by the user on a respective site of the one or more visited sites, and a form filled out by the user.

In one aspect, the model of the user behavior comprises a model based on a neural net with weights, wherein the model is used to predict a next behavior of the user.

In one aspect, the method further comprises: sending the trained model of the user behavior to the content generator, wherein the sending is performed at least with a predetermined frequency.

In one aspect, the method further comprises: sending the trained model of the user behavior to the content generator content, wherein the sending is performed at least based on demand by the content generator.

In one aspect, the database of behavior models contains models of user behavior collected during a registration of the user for the service.

In one aspect, the one or more behavior models are compared against each other using at least one of: matrices of scatter plots, individual scatter plots, and statistical significance tests.

In one aspect, the predetermined service environment comprises an environment for accessing at least one of: a list of goods and services to which access is to be granted to the user, and data which the user has been granted permission to access based on an analysis of the behavior model received from the model transmitter.

Figure 3:
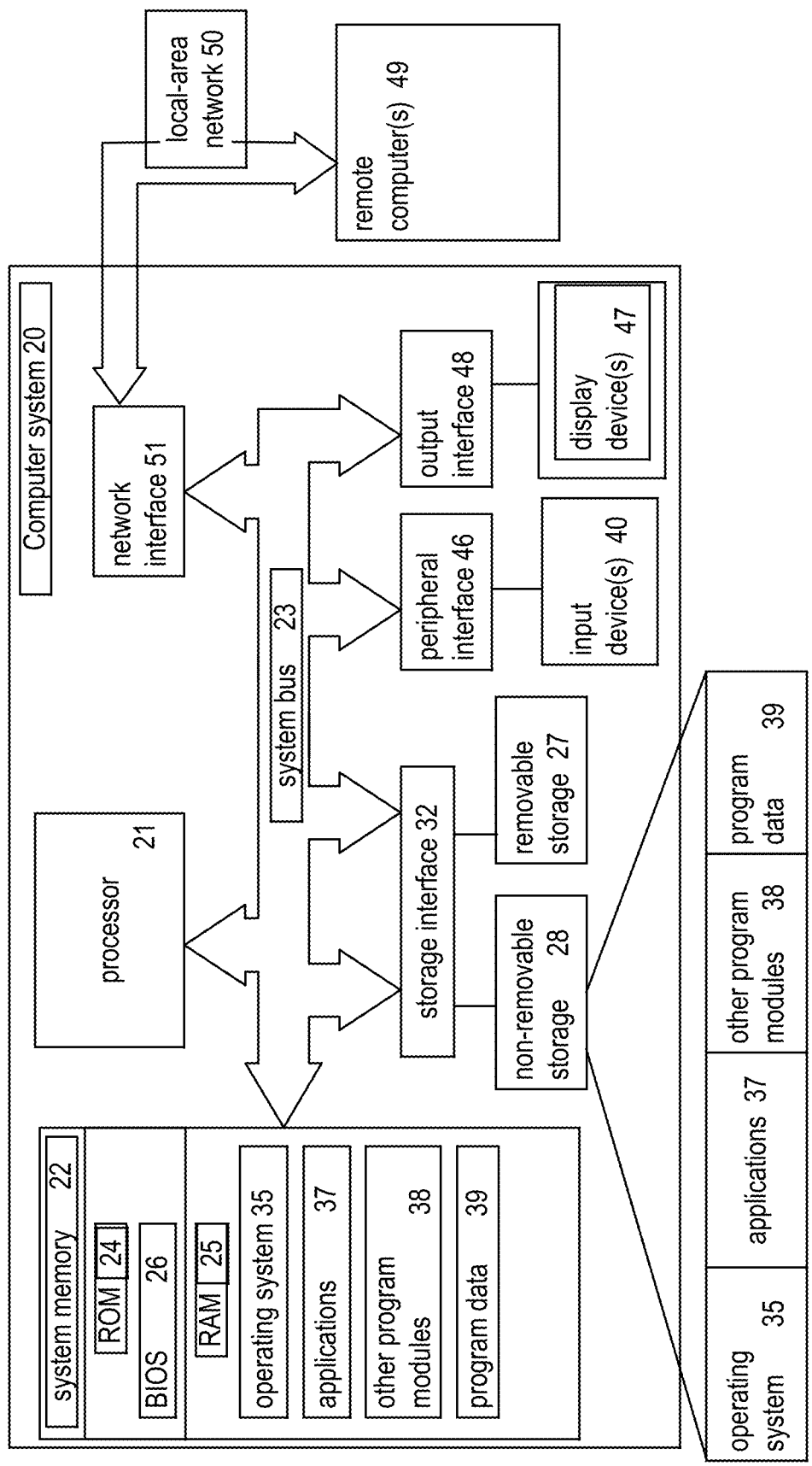
FIG. 3 presents an example of a general purpose computer system on which aspects of the present disclosure can be implemented.

FIG. 3 is a block diagram illustrating a computer system 20 on which aspects of systems and methods for providing a trained model to a computing device of a user, for training a model to identify a user to a predetermined degree of reliability, and for generating individual content for a user of a service may be implemented in accordance with exemplary aspects. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 3, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for providing a trained model to a computing device of a user, the method comprising:
   receiving, by a model transmitter, registration information from the computing device of the user comprising a trained model of the user's behavior, wherein the model is constructed using software provided by a service;
   storing, by the model transmitter, the received registration information in a database of behavior models; and
   during a repeat visit, by the user, to the service, updating the trained model of the user's behavior and transmitting the updated trained model to the service, wherein the updated trained model differs from a previously sent model of the user's behavior by no more than is allowed for unambiguous identification of the user on the service.

2. The method of claim 1, wherein the model transmitter comprises:
   a separate application that intercepts requests for services, where the interception is performed to provide, to the services to which the requests are directed, a trained model of user behavior as a user identifier.

3. The method of claim 1, wherein the model transmitter comprises:
   a plugin that is installed in a browser of the computing device of the user that automatically provides the trained model of user behavior to the service when the user visits a site of the respective service.

4. The method of claim 1, wherein the model transmitter comprises:
   a script that contains elements of the trained model of user behavior and that is embedded on the site of the service.

5. The method of claim 1, wherein the model transmitter authorizes a user on the service based on a result of a comparison of the model of user behavior and models of user behaviors stored in the database of behavior models, such that a first user working on a same computing device as a second user is distinguishable from the second user to a predetermined degree of reliability.

6. The method of claim 1, further comprising:
   transmitting the trained model to a content generator.

7. The method of claim 6, wherein the trained model is transmitted to the content generator at least based on one of:
   a predetermined frequency; and
   a demand by the content generator.

8. A system for providing a trained model to a computing device of a user, comprising:
   at least one memory; and
   at least one processor of a computing device coupled to the at least one memory, and configured to:
   receive, by a model transmitter, registration information from the computing device of the user comprising a trained model of the user's behavior, wherein the model is constructed using software provided by a service;
   store, by the model transmitter, the received registration information in a database of behavior models; and
   during a repeat visit, by the user, to the service, update the trained model of the user's behavior and transmit the updated trained model to the service, wherein the updated trained model differs from a previously sent model of the user's behavior by no more than is allowed for unambiguous identification of the user on the service.

9. The system of claim 8, wherein the model transmitter comprises:
   a separate application that intercepts requests for services, where the interception is performed to provide, to the services to which the requests are directed, a trained model of user behavior as a user identifier.

10. The system of claim 8, wherein the model transmitter comprises:
    a plugin that is installed in a browser of the computing device of the user that automatically provides the trained model of user behavior to the service when the user visits a site of the respective service.

11. The system of claim 8, wherein the model transmitter comprises:
    a script that contains elements of the trained model of user behavior and that is embedded on the site of the service.

12. The system of claim 8, wherein the model transmitter authorizes a user on the service based on a result of a comparison of the model of user behavior and models of user behaviors stored in the database of behavior models, such that a first user working on a same computing device as a second user is distinguishable from the second user to a predetermined degree of reliability.

13. The system of claim 8, the processor further configured to:
    transmit the trained model to a content generator.

14. The system of claim 13, wherein the trained model is transmitted to the content generator at least based on one of:
    a predetermined frequency; and
    a demand by the content generator.

15. A non-transitory computer readable medium storing thereon computer executable instructions for providing a trained model to a computing device of a user, including instructions for:
    receiving, by a model transmitter, registration information from the computing device of the user comprising a trained model of the user's behavior, wherein the model is constructed using software provided by a service;
    storing, by the model transmitter, the received registration information in a database of behavior models; and
    during a repeat visit, by the user, to the service, updating the trained model of the user's behavior and transmitting the updated trained model to the service, wherein the updated trained model differs from a previously sent model of the user's behavior by no more than is allowed for unambiguous identification of the user on the service.

16. The non-transitory computer readable medium of claim 15, wherein the model transmitter comprises:
    a separate application that intercepts requests for services, where the interception is performed to provide, to the services to which the requests are directed, a trained model of user behavior as a user identifier.

17. The non-transitory computer readable medium of claim 15, wherein the model transmitter comprises:
a plugin that is installed in a browser of the computing device of the user that automatically provides the trained model of user behavior to the service when the user visits a site of the respective service.

18. The non-transitory computer readable medium of claim 15, wherein the model transmitter comprises:
a script that contains elements of the trained model of user behavior and that is embedded on the site of the service.

19. The non-transitory computer readable medium of claim 15, wherein the model transmitter authorizes a user on the service based on a result of a comparison of the model of user behavior and models of user behaviors stored in the database of behavior models, such that a first user working on a same computing device as a second user is distinguishable from the second user to a predetermined degree of reliability.

20. The non-transitory computer readable medium of claim 15, further comprising:
transmitting the trained model to a content generator.

21. The non-transitory computer readable medium of claim 20, wherein the trained model is transmitted to the content generator at least based on one of:
a predetermined frequency; and
a demand by the content generator.

* * * * *